United States Patent [19]

Hara

[11] Patent Number: 4,870,324

[45] Date of Patent: Sep. 26, 1989

[54] HALF-TONE DISPLAY SYSTEM FOR A FLAT MATRIX TYPE CATHODE-RAY TUBE

[75] Inventor: Zenichirou Hara, Nagasaki, Japan

[73] Assignee: Mitsubishi Denki Kabushiki Kaisha, Tokyo, Japan

[21] Appl. No.: 7,164

[22] Filed: Jan. 27, 1987

[30] Foreign Application Priority Data

Jan. 24, 1986 [JP] Japan .................. 61-14095

[51] Int. Cl.$^4$ .................................. G09G 3/10
[52] U.S. Cl. .................... 315/169.1; 315/169.2; 315/169.3; 340/793; 340/814
[58] Field of Search ........... 315/169.1, 169.2, 169.4, 315/169.3; 340/776, 793, 789, 814, 811, 702, 703

[56] References Cited

U.S. PATENT DOCUMENTS

| | | | |
|---|---|---|---|
| 3,838,209 | 9/1974 | Tsuchiya et al. | 340/793 |
| 3,906,290 | 9/1975 | Kurahashi et al. | 340/793 |
| 3,940,757 | 2/1976 | Purchase | 340/793 |
| 4,158,200 | 6/1979 | Seitz et al. | 340/793 |
| 4,458,244 | 7/1984 | Yamaguchi et al. | 315/169.2 |
| 4,532,505 | 7/1985 | Holz et al. | 315/169.4 |
| 4,559,535 | 12/1985 | Watkins et al. | 340/793 |
| 4,595,919 | 6/1986 | Holz et al. | 315/169.1 |
| 4,612,540 | 9/1986 | Pratt | 340/793 |
| 4,633,139 | 12/1986 | Endo et al. | 315/169.1 |
| 4,665,345 | 5/1987 | Shionoya et al. | 315/169.4 |
| 4,684,849 | 8/1987 | Otsuka et al. | 315/169.1 |
| 4,691,144 | 9/1987 | King et al. | 315/169.2 |
| 4,692,665 | 9/1987 | Sakuma | 315/169.4 |
| 4,692,666 | 9/1987 | Okamoto et al. | 315/169.4 |
| 4,769,713 | 9/1988 | Yasui | 340/793 |

Primary Examiner—Leo H. Boudreau
Assistant Examiner—Michael Razavi
Attorney, Agent, or Firm—Sughrue, Mion, Zinn, Macpeak & Seas

[57] ABSTRACT

A half-tone display system for a flat matrix type CRT, in which, in displaying video signals such as television signals, half-tone display of n gradations is effected for one field, the one-field scanning signal frequency is made m times as high, and the data signal is made to perform the half-tone display of n/m gradations during a 1/m field period. With such a half-tone display system, the scanning frequency is made different from an AC drive source's frequency, and therefore the displayed picture is free from undesired beat interference or flickering phenomonon. Thus, the displayed picture is steady at all times.

4 Claims, 3 Drawing Sheets

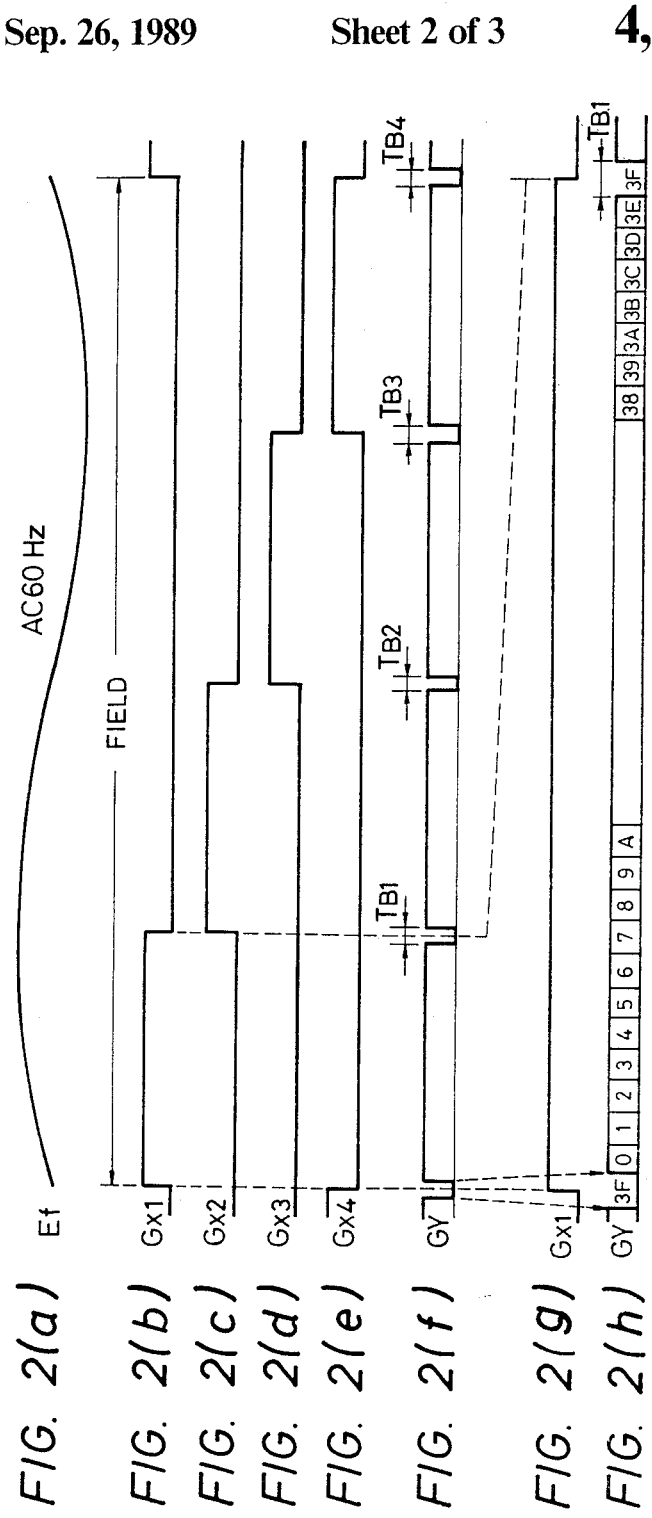

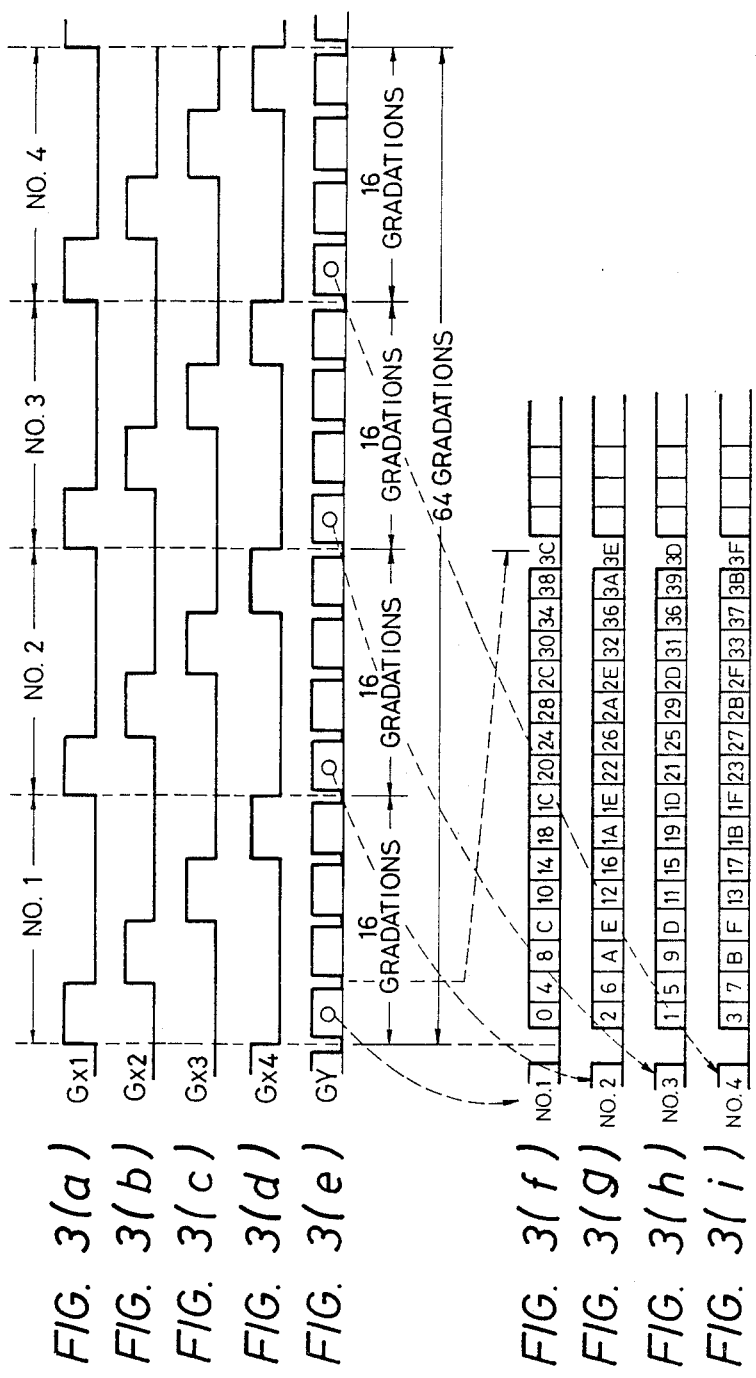

HALF-TONE DISPLAY SYSTEM FOR A FLAT MATRIX TYPE CATHODE-RAY TUBE

BACKGROUND OF THE INVENTION

1. Field of the Invention

This invention relates to a half-tone display system in which, in displaying video signals such as television signals, half-tone displaying of n gradations is achieved per field, the n being positive integer. More particularly, the present invention relates to a half-tone display system for a flat matrix type cathode-ray tube (CRT) in which pictures displayed on the CRT are prevented from flickering such as beat interference.

2. Description of the Prior Art

An example of a conventional flat matrix type CRT is so designed that grid electrodes consist of a plurality of scanning electrodes and a plurality of data electrodes which are arranged to form a matrix structure together with the scanning electrodes. Pulse voltages of predetermined gradations are applied selectively to one of the electrodes in the two different electrode groups so that picture elements designated by the selected scanning electrodes and data electrodes to which the pulse voltage are applied, are caused to emit light.

In this operation, as is well known in the art, electrons emitted from a direct-heating type linear filament are accelerated by the voltages applied to the grid electrodes consisting of the scanning electrodes and the data electrodes, to impinge an anode at a high voltage, whereby a light emitting material such as a fluorescent layer which is formed on the anode by coating, is caused to emit light by the energy of collision.

FIG. 1 shows the grid electrode structure of such a flat matrix type CRT. In the flat matrix type CRT of FIG. 1, the grid electrode structure is a 4×4 matrix structure consisting of scanning electrodes X1 through X4 and data electrodes Y1 through Y4. In correspondence to the 4×4 matrix structure, fluorescent substances of red, green and blue are applied to the predetermined parts of the anode surface (not shown) as required, so that sixteen (16) picture elements in one field can appear red (R), green(G), and blue (B).

A desired one of the picture elements can be selected by applying voltages to the scanning electrode and the data electrode which are provided correspondingly for the picture element. And only the picture element thus selected can emit light.

FIGS. 2(a) through 2(h) are diagrams for a description of a conventional half-tone display system for the above-described flat matrix type CRT, in which one field is divided into four parts, and, in a ¼ duty, display is carried out with sixty-four (64) gradations. In FIGS. 2(b) through 2(e), reference characters $GX_1$ through $GX_4$ designate the voltage waveforms of scanning signals applied to the scanning electrodes X1 through X4 shown in FIG. 1, respectively. In FIG. 2(f), reference character GY designates one of the voltage waveforms of data signals applied to the data electrodes Y1 through Y4 shown in FIG. 1. As shown enlarged in FIGS. 2(g) and 2(h), while one of the scanning signals, $GX_1$ for instance, is selected, a signal of sixty-four gradations 0, 1, 2, ... A, ... 38, 39, 3A, ... 3F (=N) in hexadecimal notation is provided as the data signal. In FIGS. 2(f) and 2(h), reference characters TB1 through TB4 designate blanking periods.

In the case where a DC drive source is employed for the above-described CRT, a potential difference occurs between both ends of the direct-heating type linear filament (cathode) resulting in varying the brightness of a picture displayed thereon. In order to eliminate this difficulty, an AC power source is employed. As shown in FIG. 2(a), an AC drive voltage $E_f$ is supplied to the filament to maintain the brightness of the display picture uniform.

Further, in the case where, in displaying ordinary information, half-tone displaying is not required, the scanning electrodes can be scanned at a high speed, and the frequency can be selected as desired. On the other hand, in the case where the half-tone displaying is required to display video signals such as television signals, the picture is such that the scanning is repeated sixty (60) times per second and one (1) field is provided per 1/60 second. Therefore, the repetitive period of the picture coincides with the oscillation period of the drive source, as a result of which noises such as beats in the displayed picture occur.

SUMMARY OF THE INVENTION

Accordingly, in view of the above, an object of the present invention is to eliminate the above-described difficulties accompanying a conventional half-tone display system.

According to the present invention, an improved half-tone display system is provided to meet the above and other objects of the invention, in which, in displaying video signals such as television signals, a half-tone display of n gradations is effected for each field, and a one-field scanning signal frequency is made m times as high and a data signal performs a half-tone display of n/m gradations during each 1/m field period.

BRIEF DESCRIPTION OF THE DRAWINGS

In the accompanying drawings,

FIGS. 2(a) through 2(h) are diagrams for a description of a conventional half-tone display system; and FIGS. 3(a) through 3(i) are diagrams for a description of a half-tone display system according to the present invention.

DESCRIPTION FOR A PREFERRED EMBODIMENT

Figure 1:
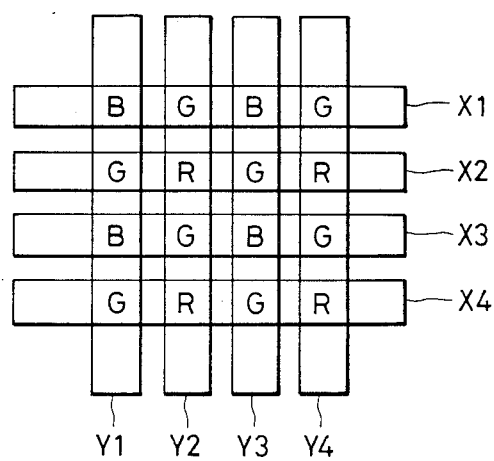
FIG. 1 is an explanatory diagram showing the structure of grid electrodes in the CRT to which the technical concept of the invention is applied.

A preferred embodiment of the present invention will be described with reference to FIGS. 3(a) through 3(i). In a half-tone displaying system of the present invention, as shown in FIGS. 3(a) through 3(d), the frequency of one-field scanning signals $GX_1$ through $GX_4$ is made four times (m32 4) as high as that of signals No.1 through No.4 (when compared with the case of FIGS. 2(b) through 2(e)). As shown in FIG. 3(e), a data signal GY is made to perform the display of sixteen (16) gradations (16=64/4) during each ¼ field. The data signal is shown in FIGS. 3(f) through 3(i) in detail. For instance, for the period No. 1, a signal of sixteen (16) gradations of 0, 4, 8, C, 10, 14, 18, 1C, 20, 24, 28, 2C, 30, 34, 38, and 3C is assigned to the data signal GY.

As is apparent from the above description, in the half-tone displaying system for the CRT having grid electrodes in matrix form which consist of four lines of scanning electrodes and four columns of data electrodes, the one-field scanning signal frequency is made four times as high, and the data signal is made to perform the half-tone display of sixteen (16) gradations during a ¼ field (1/60 second) period. Accordingly, the scanning frequency will not coincide with the frequency of the AC drive source. More specifically, since the former frequency is made four times as high as the latter frequency, the difficulty that wavy beat interference occurs on the display picture or the display picture flickers, can be eliminated. Thus, the picture displayed on the CRT is always-steady and free from such a difficulty.

In the above-described embodiment, the AC drive source's frequency is 60 Hz, and the grid electrodes are in 4×4 matrix form. However, it should be noted that the invention is not limited thereto or thereby. That is, the gist of the invention resides in that the one-field scanning signal frequency is made m times as high, m being a positive integer, and the data signal is made to perform the half-tone display of n/m gradations during a 1/m field period where n is a positive integer.

In the half-tone display system of the present invention, the scanning frequency will not coincide with the drive source's frequency, which eliminates the difficulty that the displayed picture suffers from the undesired beat interference or flickering phenomenon. Thus, the displayed picture is steady at all times.

What is claimed is:

1. In a pulse width modulation half-tone display system for a flat matrix type display wherein a half-tone display of n gradations is effected for each field to display video signals, wherein the improvement comprises means for producing the field scanning signal frequency for scanning one field m times the field scanning frequency of the video signals, and means for causing the data signal to perform a half-tone display of n/m gradation during each 1/m field period, wherein the m and n are positive integers n is greater than m and neither is equal to 1.

2. The half-tone display system as defined in claim 1 wherein the number of gradations n is 64 and said means for producing the field scanning signal frequency produces a field scanning signal frequency 4 times the field scanning frequency of the video signals.

3. In a half-tone display system for flat matrix type display effecting a half-tone display of n gradation per field, a method for improving the display of video signals comprising the steps of:

(a) making the field scanning signal frequency for scanning one field m times the field scanning frequency of the video signal, and (b) causing a data signal to perform a half-tone display of n/m gradations for each 1/m field period.

(c) where m and n are positive integers n is greater than m and neither is equal to 1.

4. The half-tone display system is defined in claim 3 wherein the number of gradations n is 64 and said step of making the field scanning signal frequency for scanning one field m times the field scanning frequency of the video signal makes the field scanning signal frequency 4 times the field scanning frequency of the video signal.

* * * * *